Figure 1:
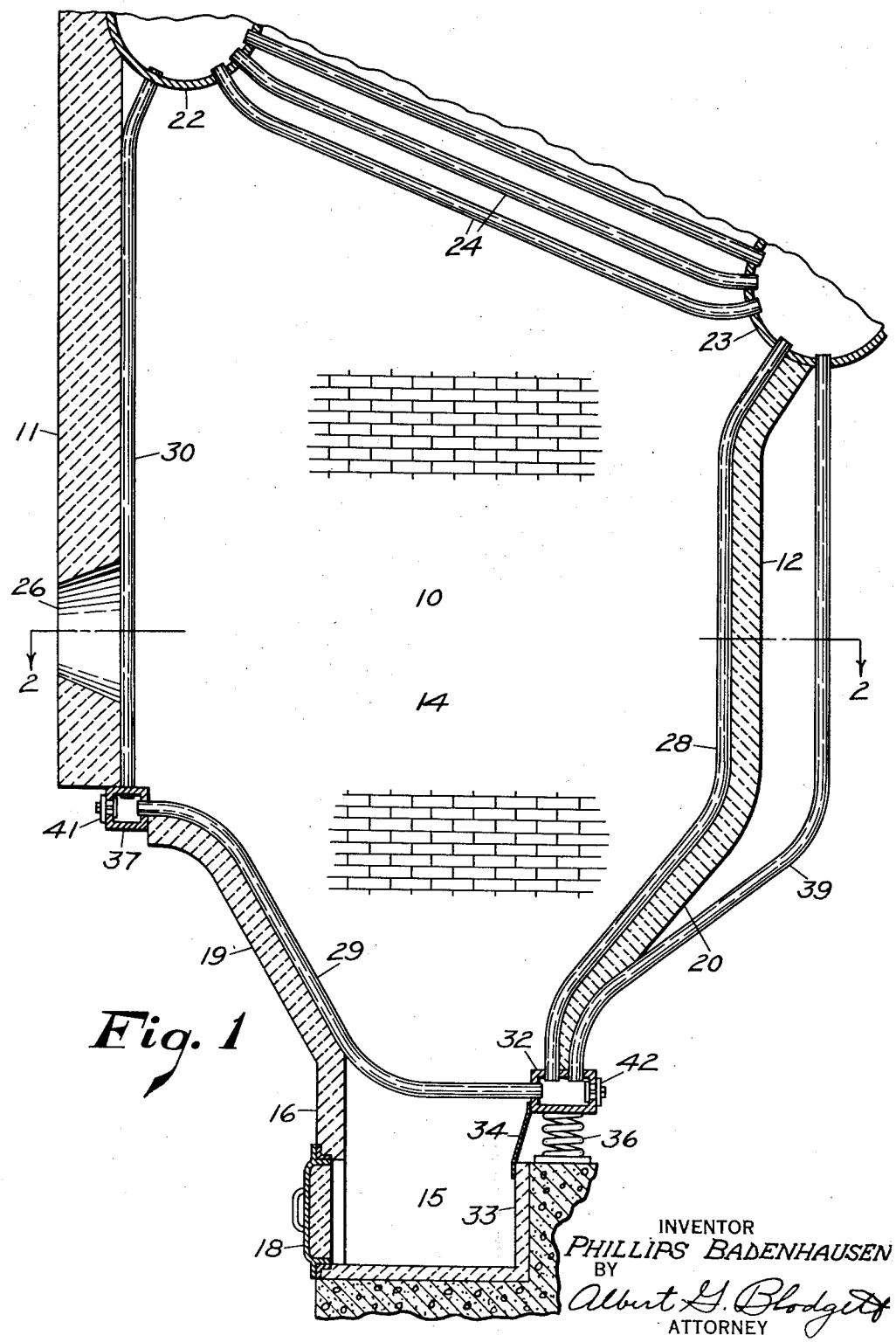

Dec. 12, 1933.  P. BADENHAUSEN  1,939,535
WATER COOLED FURNACE
Filed Sept. 2, 1931  2 Sheets-Sheet 2

INVENTOR
PHILLIPS BADENHAUSEN
BY
Albert G. Blodgett
ATTORNEY

Patented Dec. 12, 1933

1,939,535

UNITED STATES PATENT OFFICE 1,939,535

WATER COOLED FURNACE

Phillips Badenhausen, Philadelphia, Pa., assignor to Badenhausen Corporation, Cornwells Heights, Pa., a corporation of Pennsylvania Application September 2, 1931. Serial No. 560,705

6 Claims. (Cl. 122—235)

This invention relates to water cooled furnaces, and more particularly to furnaces of this type which are arranged for burning finely divided fuel, such as pulverized coal, for the purpose of generating steam.

Pulverized coal is ordinarily delivered to a furnace on a current of air and burned while in suspension in the furnace, the gaseous products of combustion being passed through a boiler which absorbs heat from these gases and thus generates steam. While a part of the ash from the coal is carried through the boiler a large portion thereof is deposited in the furnace chamber and must be removed occasionally to prevent blocking of the operation. This ash is frequently deposited in the form of a liquid slag, particularly when the furnace temperature is high and the ash is of a type which melts easily, and this slag adheres to the walls and bottom of the furnace, gradually building up to a considerable thickness. These slag accumulations become very hard when the furnace is shut down, and they can be removed only with great difficulty and at large expense.

These difficulties have been recognized, and it has already become common practice to provide water tubes adjacent to the walls and bottoms of pulverized fuel furnaces to reduce the furnace temperature by absorption of radiant heat from the flame and to prevent adherence of slag to the bounding surfaces of the furnace. It has furthermore been proposed to provide water cooled furnace bottoms which slope downwardly from opposite directions toward an ash pit located beneath the center of the furnace, such an arrangement being known in the art as a "hopper bottom furnace". In furnaces of this type as heretofore constructed, each of the two sets of sloping water tubes associated with the furnace bottom is provided with a separate lower header arranged to supply water to the lower ends of the tubes. Furthermore, each of these headers must be supplied with water by means of a suitable piping system. The construction is therefore complicated and expensive. The headers in particular are extremely expensive, since they are usually forged from solid steel ingots.

It is accordingly one object of the invention to provide a water cooled hopper bottom furnace which is comparatively simple and inexpensive to construct.

It is a further object of the invention to provide a water cooled furnace which is particularly suitable for burning pulverized fuel in suspension, and which is so arranged that the ash discharged from the flame may be easily removed from the furnace.

It is a further object of the invention to provide a construction for a water cooled hopper bottom furnace which is so arranged that the tubes associated with the furnace walls and bottom may be simply and directly connected into the circulation system of a standard type of water tube boiler.

With these and other objects in view, as will be apparent to those skilled in the art, my invention resides in the combination of parts set forth in the specification and covered by the claims appended hereto.

In accordance with my invention, I provide a hopper bottom furnace suitable for burning pulverized fuel in suspension, and comprising two bottom walls which slope downwardly from opposite directions toward an ash pit. This ash pit is preferably narrow and located beneath the central portion of the furnace. In order to protect the furnace walls and particularly the bottom walls from the intense heat of the pulverized fuel flame and at the same time chill the molten ash and render it easily removable, as well as to reduce the furnace temperature while using the heat thereof for the generation of steam, I provide two groups of water tubes which are associated with the sloping furnace bottoms. These tubes are preferably inclined along the slopes of both bottom walls, and both groups of tubes have their lower ends connected to a single header located near the ash pit. This single header is supplied with water from a suitable source, and serves to deliver this water to the tubes. This lower header is preferably located at one side of the narrow ash pit, and the tubes associated with the opposite sloping bottom wall are spaced apart from each other and extend across the ash pit to the header. The furnace bottom walls preferably slope rather steeply, the arrangement being such that the ash is chilled by contact with the water cooled bottom and slides by gravity into the ash pit after passing between the spaced tubes. The walls of the furnace above the sloping portions are preferably cooled by tubes forming extensions of the hopper cooling tubes or by a separate set of tubes connected into the system. A further feature of the invention involves spacing the tubes more closely on that wall of the furnace where the fuel flame tends to impinge so that the wall will be adequately protected and particularly to chill the ash deposited from the flame and thus prevent it from sticking to the wall.

Figure 2:
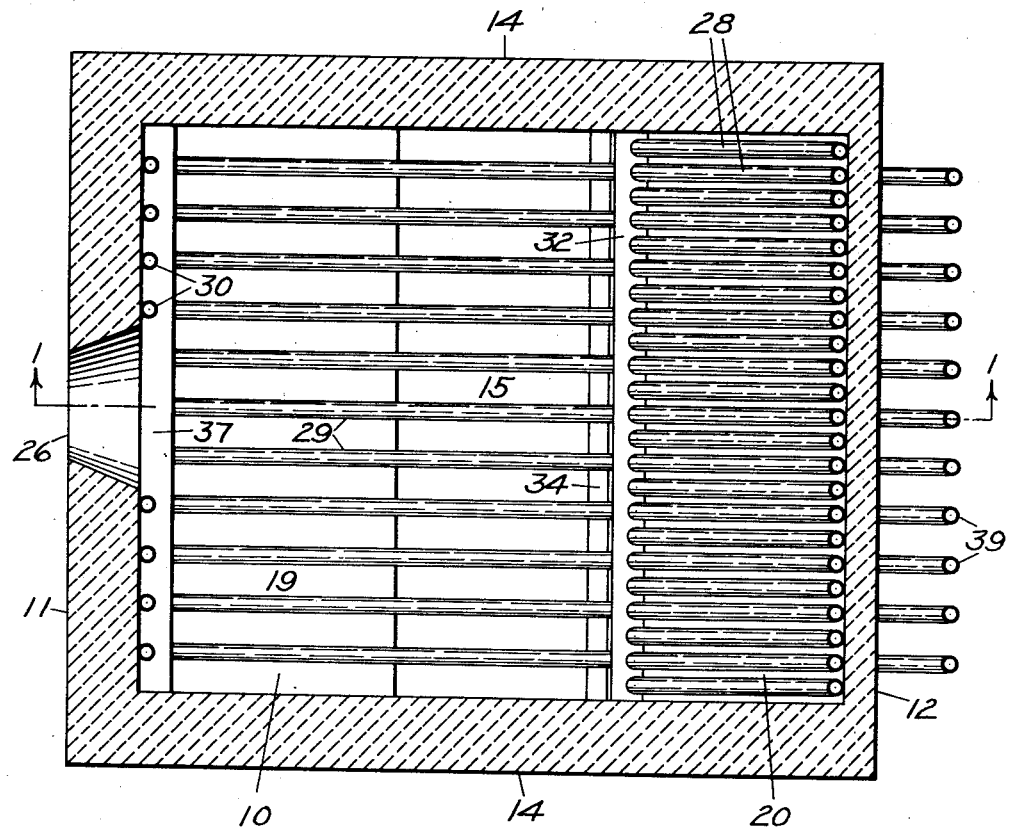

Referring to the drawings illustrating one embodiment of the invention and in which like reference numerals indicate like parts, Fig. 1 is a vertical section through a furnace, the section being taken on the line 1—1 of Fig. 2; and Fig. 2 is a section on the line 2—2 of Fig. 1.

The embodiment illustrated in the drawings comprises a furnace combustion chamber 10 having a front wall 11, a rear wall 12, and two side walls 14, all of which are formed of some suitable refractory and heat insulating material. At the bottom of the furnace I have shown a comparatively narrow ash pit 15 which extends transversely beneath the center of the furnace. The front wall 16 of the pit 15 may be provided with one or more doors 18 through which ashes may be removed as occasion demands. The front wall 11 and rear wall 12 of the furnace are connected to the ash pit 15 by sloping bottom walls 19 and 20 respectively, which form the "hopper bottom" of the furnace. These walls 19 and 20 slope downwardly from opposite directions toward the ash pit, and they are preferably steep enough to discharge ashes into the pit by gravity.

Above the combustion chamber 10 I provide a steam boiler of well known construction, a portion only being illustrated. This boiler comprises an upper transverse drum 22 near the front wall 11, a lower transverse drum 23 near the rear wall 12, and a bank of inclined water tubes 24 connecting the drums. The front wall 11 is provided with an opening 26 through which a suitable fuel, such as pulverized coal, may be introduced into the furnace chamber for combustion in suspension, the arrangement being such that the gaseous products of combustion will pass among the tubes 24 and transfer heat to the water within the tubes.

In order to prevent excessively high furnace temperatures within the combustion chamber 10, and to overcome difficulties caused by adherance of liquid slag to the bounding surfaces of the furnace, it is desirable to provide water tubes in addition to the boiler tubes to absorb heat from the flame by radiation and to maintain the furnace walls at a comparatively low temperature. For this purpose I have shown a group of parallel tubes 28 associated with the rear bottom wall 20 and the rear wall 12, a second group of parallel tubes 29 associated with the front bottom wall 19, and a third group of parallel tubes 30 associated with the front wall 11.

The tubes 28 are connected at their upper ends to the lower boiler drum 23 and at their lower ends to a transverse header 32 located above the rear wall 33 of the ash pit 15. A sealing plate 34 of heat resisting sheet metal connects the header 32 with the ash pit wall and prevents leakage of air into the furnace. The weight of the header 32 may be supported on heavy coiled springs 36. The tubes 29 are connected at their lower ends to the header 32, and extend horizontally across the top of the ash pit 15 and then upwardly along the slope of the bottom wall 19, their upper ends being connected to a transverse header 37 located at the junction of the wall 19 with the furnace front wall 11. The tubes 30 are connected at their lower ends to the header 37 and at their upper ends to the upper boiler drum 22.

While the tubes 28, 29 and 30 are shown fully exposed to the radiant heat of the furnace, it will be understood that the invention is not to be considered as limited to such a construction, since in some cases it may be desirable to embed the tubes either entirely or partially in refractory material, or cover them on the furnace side with heat conducting plates. Such arrangements are well known in this art.

In a furnace of the type illustrated, which is fired through the front wall, it is more important to protect the rear walls 12 and 20 than the front walls 11 and 19. This is because there is a much greater tendency for flame impingement on the rear walls, and in addition a large portion of the ash is thrown to the rear of the furnace. I therefore prefer to space the tubes 28 more closely together than the tubes 29 and 30, as shown in Fig. 2. The wide spacing of the tubes 29 furthermore allows the ash to pass readily between them and enter the ash pit 15 without danger of bridging across the tubes. As illustrated particularly in Fig. 2, a few of the front wall tubes 30 may be omitted near the opening 26, to leave a space for the entering stream of fuel and air.

Water may be supplied to the lower header 32 in various ways, the preferred construction comprising a row of down-comer tubes 39 connected at their upper ends to the lower boiler drum 23 and at their lower ends to the header 32. These tubes 39 are located outside the furnace wall 12 where they are not subjected to the heat of the furnace, and they are spaced evenly along the header in order to distribute the water uniformly thereto.

The header 37 is provided with a row of hand hole caps 41 in its front wall, and the header 32 has a row of hand hole caps 42 in its rear wall. These caps permit expanding of the tubes into the headers, and also turbining of the tubes 29. The tubes 28, 30 and 39 can all be turbined from their upper ends, it being of course understood that suitable man holes (not shown) are provided in the drums 22 and 23.

The operation of the furnace will now be apparent from the above disclosure. Fuel and air are introduced into the furnace chamber 10 through the opening 26, and combustion takes place within the chamber. The gaseous products of combustion pass among the boiler tubes 24 which absorb heat and generate steam. Water from the drum 23 flows downwardly in the tubes 39 and upwardly in the tubes 28, 29 and 30 which absorb heat from the furnace chiefly by radiation and deliver a mixture of steam and water to the main circulating system of the boiler. The ash resulting from combustion is chilled by contact with the tubes 28 and 29, and slides by gravity between the tubes 29 and into the ash pit 15. The accumulation of ash in the pit can be removed when desired through the door 18.

By utilizing the single transverse header 32 to supply water to the tubes along both slopes of the hopper bottom, the entire construction is greatly simplified and the cost thereof is considerably reduced. In the illustrated embodiment I have eliminated one of the two headers heretofore provided, as well as the down-comers or connecting pipes which would be required to supply water to such header, and I have provided a single circulating system which includes the water tubes associated with the front and rear walls of the furnace and both of the sloping bottom walls. By means of the single row of down-comer tubes 39 water is delivered directly from the lower boiler drum 23 to the header 32 and distributed uniformly along its length. An adequate and constant supply of water is therefore assured for each of the heat exposed tubes, resulting in rapid circulation and avoiding all danger of overheated tubes. When the various tubes become coated internally with scale deposits and thus require cleaning, it is necessary to remove only two rows of hand hole caps, that is, the caps 41 and 42. The cleaning operation can therefore be completed in a very short time. The tubes themselves are of simple form and there are no complicated bends. In the embodiment illustrated, the tubes of each row are identical throughout the entire furnace width. This simplifies manufacturing operations, as will be appreciated, and reduces the number of spare tubes which need to be kept in stock for emergencies. The water wall tubes are arranged to discharge directly into the main boiler drums, without the intervention of expensive and complicated connecting piping which might tend to restrict the circulation.

Having thus described my invention, what I claim as new and desire to secure by Letters Patent is:

1. A furnace comprising two bottom walls sloping downwardly from opposite directions toward an ash pit, a group of evenly spaced parallel water tubes associated with one of said walls and inclined along the slope thereof, a substantially horizontal header located adjacent to one wall of the ash pit and connected to the lower ends of said tubes, a second group of tubes associated with the other of said walls and inclined along the slope thereof, the tubes of said second group extending across the top of the ash pit and having their lower ends connected to said header, and means to supply water to said header.

2. A furnace comprising two bottom walls sloping downwardly from opposite directions toward an ash pit, a group of evenly spaced parallel water tubes associated with one of said walls and inclined along the slope thereof, a substantially horizontal header located adjacent to one wall of the ash pit and connected to the lower ends of said tubes, a second group of parallel tubes associated with the other of said walls and inclined along the slope thereof, the tubes of said second group being spaced apart and extending across the top of the ash pit with their lower ends connected to said header, and means to supply water to said header.

3. A furnace comprising walls forming a furnace chamber, two bottom walls sloping downwardly from the front and rear walls of the furnace toward a narrow transverse ash pit located beneath the center of the furnace chamber, the furnace front wall having an opening therein for the introduction of fuel to be burned in suspension, a group of parallel tubes associated with the rear bottom wall and inclined along the slope thereof, a second group of parallel tubes associated with the front bottom wall and inclined along the slope thereof, the tubes of the second group being spaced apart more widely than those of the first group and extending across the top of the ash pit, a single transverse header connected to the lower ends of both groups of tubes, and means to supply water to said header.

4. A furnace comprising walls forming a furnace chamber, two bottom walls sloping downwardly from the front and rear walls of the furnace toward a narrow transverse ash pit located beneath the center of the furnace chamber, the furnace front wall having an opening therein for the introduction of fuel to be burned in suspension, a group of parallel tubes associated with the furnace rear wall and rear bottom wall and inclined along the slope of the latter, a second group of parallel tubes associated with the front bottom wall and inclined along the slope thereof, the tubes of the second group being spaced apart more widely than those of the first group and extending across the top of the ash pit, a single transverse header connected to the lower ends of both groups of tubes, means to supply water to said header, a transverse header connected to the upper ends of the tubes of said second group, and a third group of tubes extending upwardly from the last mentioned header and along the front wall of the furnace.

5. A furnace comprising a front wall having an opening therein for the introduction of fuel to be burned in suspension, a rear wall, two side walls, walls forming a narrow ash pit extending transversely beneath the center of the furnace, a front bottom wall sloping downwardly from the lower portion of the furnace front wall toward the upper edge of the ash pit front wall, a rear bottom wall sloping downwardly from the lower portion of the furnace rear wall toward the upper edge of the ash pit rear wall, a front transverse drum adjacent the upper portion of the furnace front wall, a rear transverse drum adjacent the upper portion of the furnace rear wall, a bank of inclined water tubes connecting said drums, a group of parallel water tubes extending along the slope of the rear bottom wall, and connected to the rear drum for water circulation, a transverse header connected to the lower ends of said group of tubes and located above the rear wall of the ash pit, a second group of parallel tubes spaced apart more widely than the first group and connected to said header, the tubes of the second group extending across the top of the ash pit and along the slope of the front bottom wall, means connecting the tubes of said second group to the front drum, and downcomer means connecting one of said drums with the header.

6. A furnace comprising a front wall having an opening therein for the introduction of fuel to be burned in suspension, a rear wall, two side walls, walls forming a narrow ash pit extending transversely beneath the center of the furnace, a front bottom wall sloping downwardly from the lower portion of the furnace front wall toward the upper edge of the ash pit front wall, a rear bottom wall sloping downwardly from the lower portion of the furnace rear wall toward the upper edge of the ash pit rear wall, an upper transverse drum adjacent the upper portion of the furnace front wall, a lower transverse drum adjacent the upper portion of the furnace rear wall, a bank of inclined water tubes connecting said drums, a group of parallel water tubes connected to said lower drum and extending downwardly along said furnace rear wall and rear bottom wall, a transverse header connected to the lower ends of said group of tubes and located above the rear wall of the ash pit, a second group of parallel tubes spaced apart more widely than the first group and connected to said header, the tubes of the second group extending across the top of the ash pit and along the front bottom wall with their upper ends connected to a second transverse header, water tubes associated with the furnace front wall and extending upwardly from said second header to the upper transverse drum, and spaced parallel water tubes located behind the furnace rear wall and connecting said lower transverse drum with said first mentioned header.

PHILLIPS BADENHAUSEN.